(No Model.) 7 Sheets—Sheet 3.

H. HAMMOND.
FORGING MACHINE.

No. 322,928. Patented July 28, 1885.

Witnesses:
Frank H. Pierpont
John Henry Brocklesby

Inventor:
Henry Hammond
by Albert H. Walker his Attorney

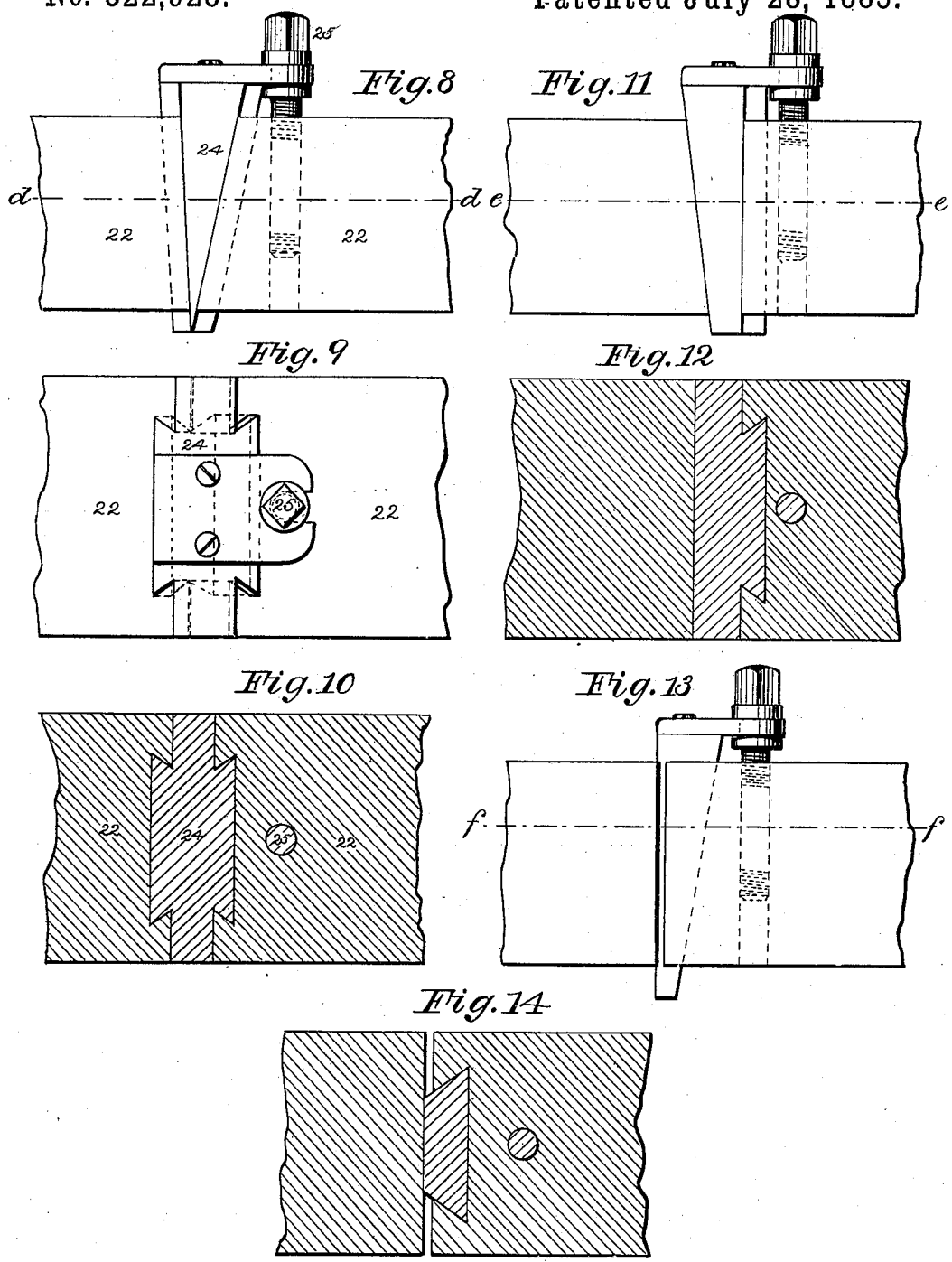

(No Model.) 7 Sheets—Sheet 5.
H. HAMMOND.
FORGING MACHINE.
No. 322,928. Patented July 28, 1885.
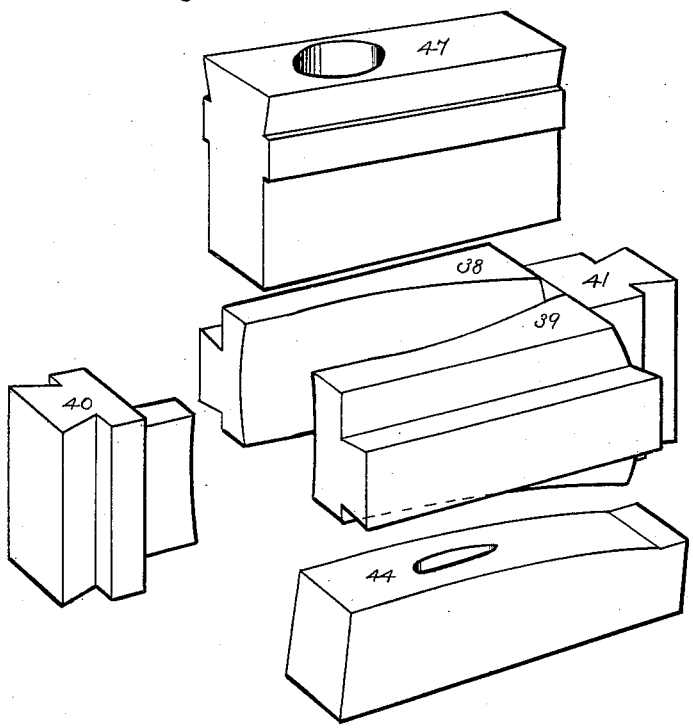
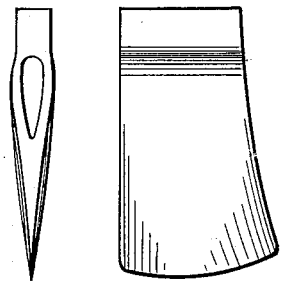
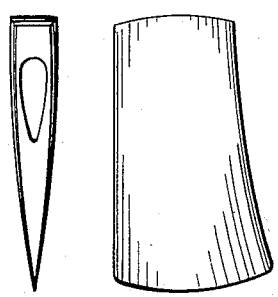
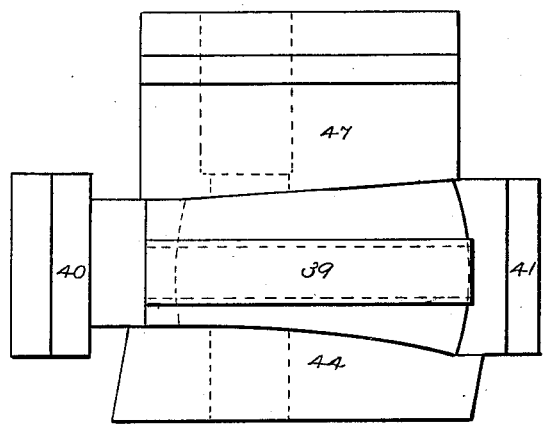
Witnesses:
Frank H. Pierpont
John Henry Brocklesby
Inventor:
Henry Hammond
by Albert H. Walker, his Attorney (No Model.) 7 Sheets—Sheet 6.

H. HAMMOND.
FORGING MACHINE.

No. 322,928. Patented July 28, 1885.

Witnesses:
Frank H. Pierpont
John Henry Brocklesby

Inventor:
Henry Hammond
by Albert H. Walker, his Attorney (No Model.)

7 Sheets—Sheet 7.

H. HAMMOND.
FORGING MACHINE.

No. 322,928. Patented July 28, 1885.

Witnesses:
Frank H. Pierpont
John Henry Brocklesby

Inventor:
Henry Hammond
by Albert H. Walker, his Atty.

UNITED STATES PATENT OFFICE.

HENRY HAMMOND, OF NEW HAVEN, CONNECTICUT.

FORGING-MACHINE.

SPECIFICATION forming part of Letters Patent No. 322,928, dated July 28, 1885.

Application filed December 26, 1884. (No model.)

*To all whom it may concern:*

Be it known that I, HENRY HAMMOND, of New Haven, Connecticut, have invented a new and useful Forging-Machine for the Manufacture of Axes and other similar articles, of which the following description and claims constitute the specification, and which is illustrated by the accompanying seven sheets of drawings.

This machine is adapted to press and cut articles of malleable metal into desired forms by means of dies forced together from three or more directions, and operated by mechanism hereinafter described.

Figure 1:
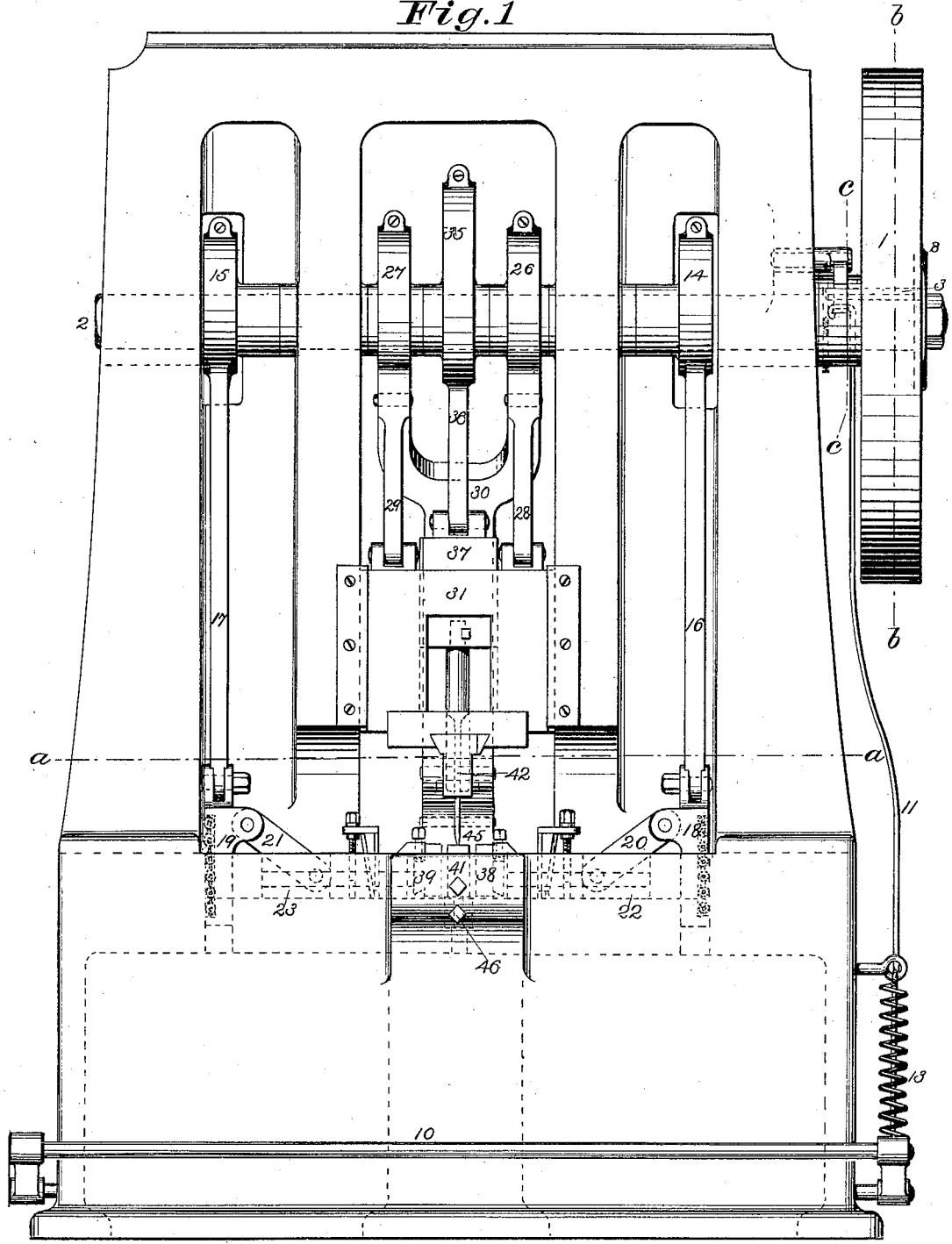
Figure 2:
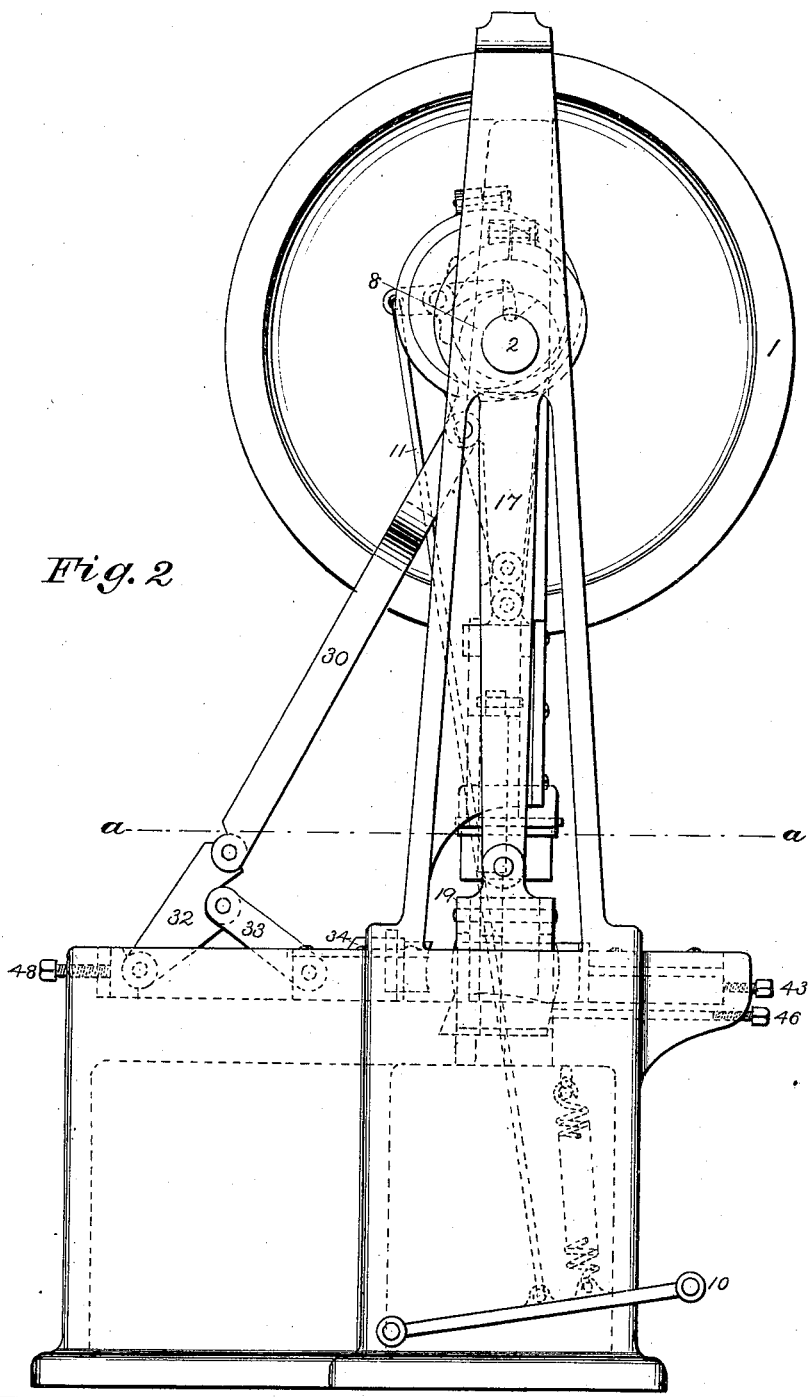
Figure 3:
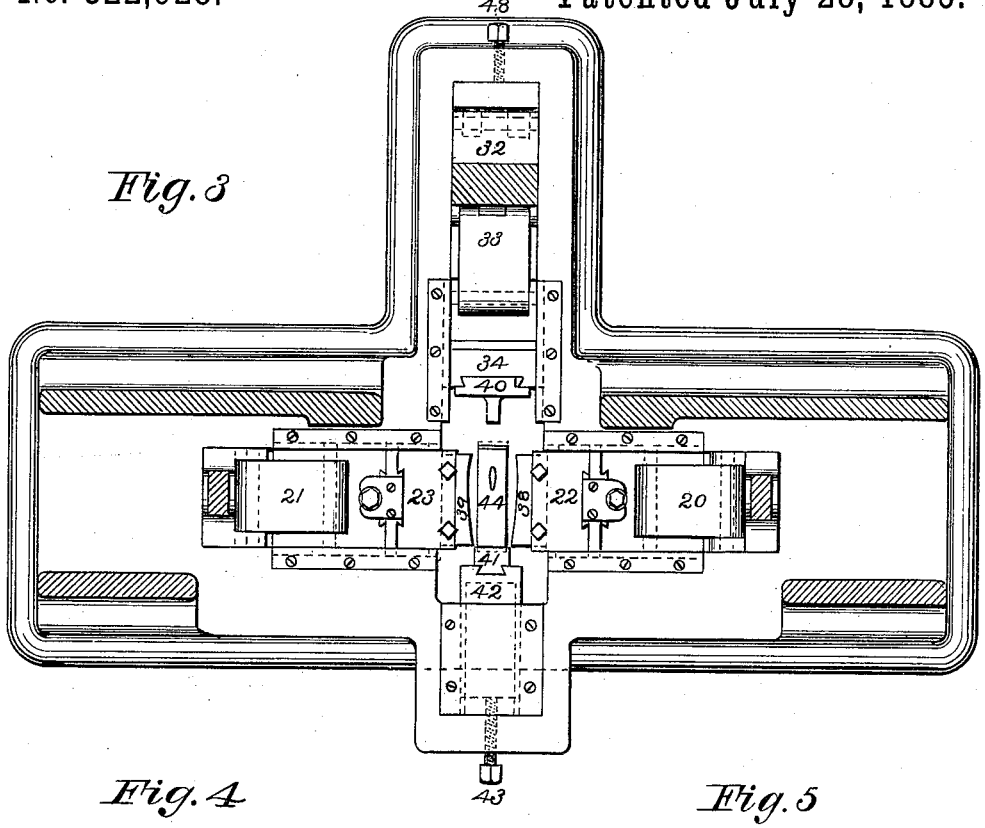
Figure 4:
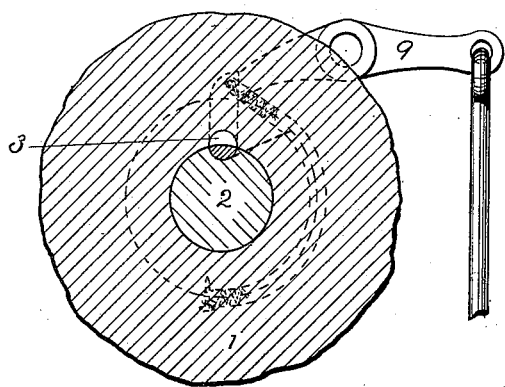
Figure 5:
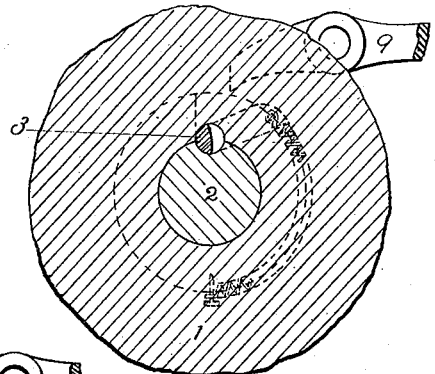
Figures 6, 7:
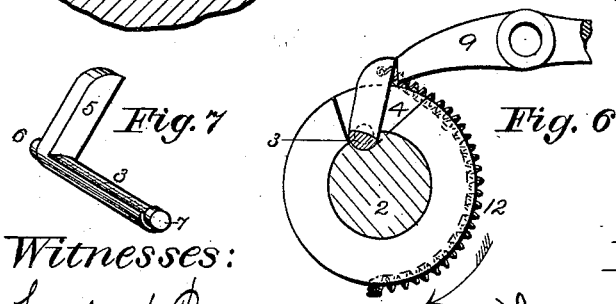
Figure 21:
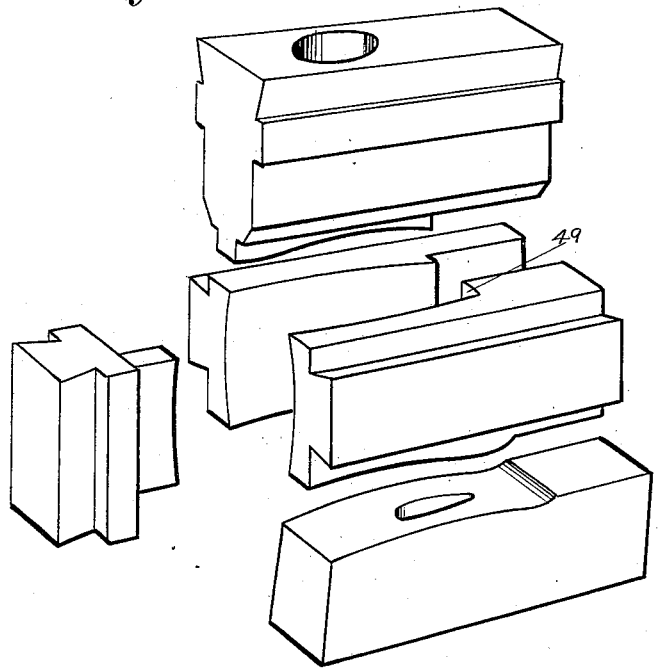
Figures 23, 24:
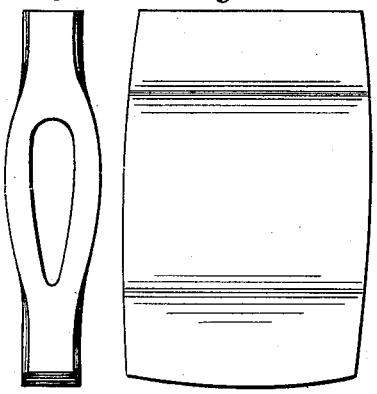
Figures 25, 26:
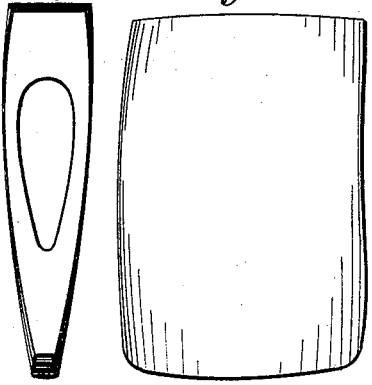
Figure 22:
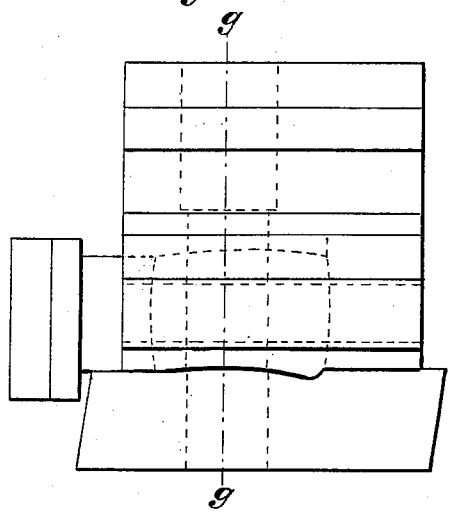
Figure 27:
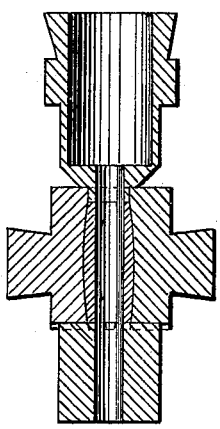
Figure 28:
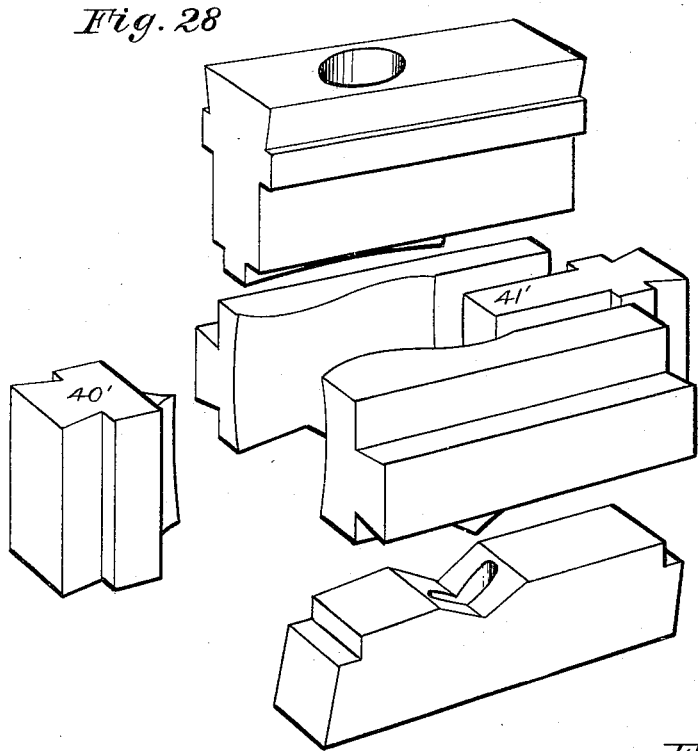
Figures 30, 31:
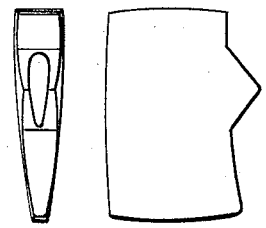
Figures 32, 33:
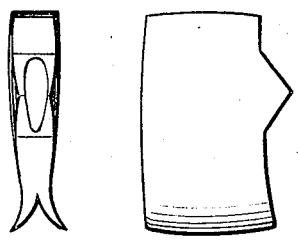
Figure 29:
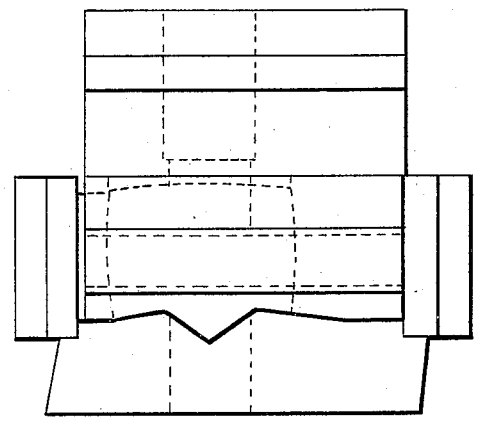

Figure 1 of the drawings is a front view, and Fig. 2 is a view of the left-hand side, of the machine. Fig. 3 is a horizontal cross-section of the same on the line $a\ a$ of Figs. 1 and 2, except that the upper die and the punch are not shown therein. Figs. 4 and 5 are fragmentary cross-sections on the line $b\ b$ of Fig. 1, showing the key 3 in different positions. Fig. 6 is a cross-section on the line $c\ c$ of Fig. 1. Fig. 7 is a perspective view of the key 3. Fig. 8 is a side view, and Fig. 9 is a plan view, of a novel length-adjusting device used at several points of the machine, while Fig. 10 is a horizontal cross-section on the line $d\ d$ of Fig. 8. Fig. 11 is a side view of a modification of the device of Fig. 8, and Fig. 12 is a horizontal cross-section on the line $e\ e$ of Fig. 11. Fig. 13 is a side view of a slight modification of the device of Fig. 11, and Fig. 14 is a horizontal cross-section on the line $f\ f$ of Fig. 13. Fig. 15 is a perspective view of a set of six dies used in the machine, and suitable for pressing the ax-blanks of Figs. 17 and 18 into the form of the ax of Figs. 19 and 20. Fig. 16 is a side view of the set of dies of Fig. 15 when in junction with each other, and having the ax of Figs. 19 and 20 between them. Figs. 17 and 18 are edge and side views, respectively, of an ax-blank prepared for the operation of the dies of Figs. 15 and 16, while Figs. 19 and 20 are edge and side views, respectively, of that blank after it has been pressed by those dies into the form of an ax. Fig. 21 is a perspective view of a set of five dies which may be used in the machine in the place of the dies of Figs. 15 and 16, and which are suitable for pressing the ax-poll blank of Figs. 23 and 24 into the form of the ax-poll of Figs. 25 and 26. Fig. 22 is a side view of the set of dies of Fig. 21 when in junction with each other and with the ax-poll of Figs. 25 and 26 between them. Figs. 23 and 24 are edge and side views, respectively, of an ax-poll blank prepared for the operation of the dies of Figs. 21 and 22, while Figs. 25 and 26 are edge and side views, respectively, of that blank after it has been pressed by those dies into the form of an ax-poll. Fig. 27 is a perpendicular cross-section of the dies and ax-poll on the line $g\ g$ of Fig. 22. Fig. 28 is a perspective view of a set of six dies which may be used in the machine in the place of any other set, and which are suitable for slitting the edge of the ax-poll of Figs. 30 and 31 for the reception of the bit of the ax, as shown in Figs. 32 and 33. Fig. 29 is a side view of the set of dies of Fig. 28 when in junction with each other, and having the ax-poll of Figs. 32 and 33 between them. Figs. 30 and 31 are edge and side views, respectively, of an ax-poll prepared for the operation of the dies of Figs. 28 and 29, while Figs. 32 and 33 are edge and side views, respectively, of the ax-poll of Figs. 30 and 31 after its edge has been split by the operation of the dies.

The pulley 1 runs as a loose pulley upon the shaft 2 when the key 3 is in the position shown in Fig. 4, and as a fixed pulley when that key is in the position shown in Fig. 5. The shaft 2 is enlarged just outside of the frame of the machine, so as to correspond in diameter at that point with the hub of the pulley 1. The journal of the shaft 2 has, longitudinally of its periphery, a groove corresponding in cross-section with the middle portion of the key 3. In the face of the enlarged part of the shaft 2 is the recess 4, in which the arm 5 of the key 3 is adapted to oscillate. In the rear wall of that recess there is a round socket for the reception of the bearing 6 of the key 3. The bearing 7 of the key 3 turns in a socket in the washer 8, which washer revolves with the shaft 2. The axes of the bearings 6 and 7 are on a line with the upper surface of the middle part of the key 3, and the axes of the two sockets are on a line with the circle of the journal of the shaft 2. The dog 9 is pivoted to the side of the machine and is worked by the treadle 10, to which it is connected by the rod 11. The spring 12 holds the key in the position shown in Fig. 5 at all times except when the arm of the key is raised to its upright position by colliding with the dog 9. It so collides and thus stops the shaft at each revolution unless the treadle is kept depressed against the action of the spring 13. Whenever the shaft is not revolving it may be started by depressing the treadle, and thus releasing the arm of the key from the dog.

The eccentrics 14 and 15 on the shaft 2 work the connecting-rods 16 and 17, the upright slides 18 and 19, the links 20 and 21, and the horizontal slides 22 and 23, respectively. Those slides are adjustable in length by means of the length-adjusting device shown in Figs. 8, 9, and 10.

The length-adjusting device consists of the compound wedge 24 and the set-screw 25. The wedge has both sides dovetailed, as shown, and those dovetailed sides work in corresponding dovetail grooves in the adjacent ends of the two parts of the slide 22. The raising or lowering of the wedge is effected by means of the set-screw, and shortens or lengthens the slide, as the case may be. The modified forms of the length-adjusting device shown in Figs. 11, 12, 13, and 14 have wedges with but one dovetail side, and therefore serve only to lengthen the slides in which they are or may be inserted, relying upon backward pressure to shorten them whenever the set-screws are raised.

The eccentrics 26 and 27 work the rods 28 and 29, and also the bifurcated rod 30. The rods 28 and 29 work the gate or die-holder 31, while the rod 30 works the adjustable links 32 and 33, and through them the slide 34. The eccentric 35 works the rod 36, and that rod works the punch-holder 37, which slides up and down between the four walls of the upper part of the gate or die-holder 31.

The slides 22 and 23 carry upon their inner ends the two side dies, 38 and 39, respectively, of the set of dies of Fig. 15, and the slide 34 carries upon its inner end the end piece 40 of the same, while the end piece 41 is held rigidly in the die-holder 42, which die-holder is adjustable by the set-screw 43. The lower piece, 44, of the set of dies of Fig. 15 is provided with an oval hole for the reception of the end of the punch 45, and it rests solidly upon the bed of the machine and is held firmly in position by the set-screw 46. The upper die, 47, of the set of dies of Fig. 15 is held in the gate or die-holder 31, and is provided with a hole for the passage of the punch 45. The set-screw 48 may be used to adjust the links 32 and 33 to different angles to each other.

The dies shown in Figs. 21 and 22 differ from those shown in Figs. 15 and 16 in form, and also in the fact that the fixed end piece 41 is omitted and its function performed by the shoulder 49 on one of the side pieces, and also in the fact that the upper die works between the two side dies instead of wholly above them.

The dies shown in Figs. 28 and 29 differ from those shown in Figs. 15 and 16 in form, and also in the fact that the fixed end piece 41 is replaced by the fixed end piece 41', which works between the side dies instead of at their ends; and also in the fact that the upper die works between the two side dies instead of wholly above them; and also in the fact that the movable end piece 40 is replaced by the movable end piece 40', which splits the edge of the ax-poll instead of forming the head of the ax by upsetting the head of the ax-poll.

The dies shown in Figs. 15 and 16 are adapted to form the eye and head of an ax by the process set forth in my application No. 144,169 for Letters Patent of the United States, filed in September, 1884, where said eye and head are formed after the forming of the blade of the ax; and the dies shown in Figs. 21 and 22 are adapted to form the eye and head of an ax by the same process when they are formed before the blade is completed.

The dies of Figs. 28 and 29 are adapted to hold an ax-poll between the two side dies and between the upper and the lower die, while the movable end piece 40' splits the edge of the ax-poll, the latter being prevented from longitudinal movement by the fixed end piece 41'.

The mode of operation of this machine is as follows: The shaft 2 at each intermittent revolution forces the side dies, 38 and 39, horizontally together through the eccentrics 14 and 15, the upright slides 18 and 19, the links 20 and 21, and the horizontal slides 22 and 23, respectively, while the end die 40 is forced toward the fixed end die 41 by the shaft 2 through the eccentrics 26 and 27, the bifurcated rod 30, the links 32 and 33, and the slide 34, and the top die, 42, is forced downward upon the blank inclosed between the two side dies, and is so forced by the shaft 2 through the eccentrics 26 and 27, the rods 28 and 29, and the gate or die-holder 31. Then the shaft 2 forces the punch 45 down through the hole in the upper die and through the blank and into the hole in the lower die by means of the eccentric 35, the rod 36, and the punch-holder 37. Thus the punch enlarges the hole in the blank of Fig. 17 into the size of that in Fig. 19, and the end die 40 upsets the head of the ax-blank into the form of the head of the ax. Thereupon the punch is carried by the upward motion of the eccentric 35 faster than the die-holder 31 is carried by the upward motion of the eccentrics 26 and 27, and the article punched is thus stripped from the punch, and may be removed from the machine. In the meantime the eccentrics 14, 15, 26, and 27 are taking their upward motion, and are thus separating the movable dies from each other. At the end of the upward motion of all the eccentrics the revolution of the shaft 2 is stopped by the arm 5 of the key 3 colliding with the dog 9. Then another blank to be operated upon may be placed in the machine, and the machine may be started on another revolution of the shaft by depressing the treadle 10. More than one revolution may be had without stopping, and thus more than one operation of the dies upon the same blank may be successively caused by simply keeping the treadle depressed. So, also, any one of many other kinds of sets of dies may be used in the machine in place of those shown in the drawings.

I claim as my invention—

1. The combination of the shaft 2, having the eccentrics 14, 15, 26, and 27, with the rods 16, 17, 28, 29, and 30, and with the gate 31, carrying the die 42, and with the link-lever 32, link 33, and slide 34, working the die 40, and with the slide 18, link 20, and slide 22, working the die 38, and with the slide 19, link 21, and slide 23, working the die 39, all substantially as described.

2. A set of dies constructed substantially as shown in Fig. 15 of the drawings and described in the corresponding part of the specification.

HENRY HAMMOND.

Witnesses:
 ALBERT H. WALKER,
 FRANK H. PIERPONT.